US010160618B2

(12) United States Patent
Sorsa et al.

(10) Patent No.: US 10,160,618 B2
(45) Date of Patent: Dec. 25, 2018

(54) ELEVATOR EVACUATION SYSTEM CONFIGURED TO ACCOUNT FOR PRIORITIZED EVACUATION

(71) Applicants: Janne Sorsa, Helsinki (FI); Marja-Liisa Siikonen, Helsinki (FI)

(72) Inventors: Janne Sorsa, Helsinki (FI); Marja-Liisa Siikonen, Helsinki (FI)

(73) Assignee: Kone Corporation, Helsinki (FI)

( * ) Notice: Subject to any disclaimer, the term of this patent is extended or adjusted under 35 U.S.C. 154(b) by 408 days.

(21) Appl. No.: 14/952,297

(22) Filed: Nov. 25, 2015

(65) Prior Publication Data

US 2016/0083219 A1 Mar. 24, 2016

Related U.S. Application Data

(63) Continuation of application No. PCT/FI2013/050595, filed on May 31, 2013.

(51) Int. Cl.
*B66B 1/20* (2006.01)
*B66B 1/28* (2006.01)
(Continued)

(52) U.S. Cl.
CPC .............. *B66B 1/28* (2013.01); *B66B 1/3415* (2013.01); *B66B 1/3476* (2013.01); *B66B 5/021* (2013.01); *B66B 11/0213* (2013.01); *G05B 15/02* (2013.01)

(58) Field of Classification Search
CPC ....... B66B 1/28; B66B 1/3415; B66B 1/3476; B66B 5/021; B66B 11/0213; G05B 15/02
(Continued)

(56) References Cited

U.S. PATENT DOCUMENTS 5,979,607 A * 11/1999 Allen ...................... B66B 5/024
187/384
7,182,174 B2 * 2/2007 Parrini .................... B66B 5/022
182/18
(Continued)

FOREIGN PATENT DOCUMENTS

CN 102398809 A 4/2012
EP 1849733 A1 10/2007
(Continued)

OTHER PUBLICATIONS

International Search Report PCT/ISA/210 for International Application No. PCT/FI2013/050595 dated Jan. 10, 2014.
(Continued)

*Primary Examiner* — Anthony Salata
(74) *Attorney, Agent, or Firm* — Harness, Dickey & Pierce, P.L.C.

(57) ABSTRACT

A method for evacuating people with an elevator system. The method including identifying an evacuation mode in the elevator system; determining the amount of people in each building floor to be evacuated by a normal evacuation service of the elevator system and whether there exists at least one person to be evacuated who is entitled to a prioritized evacuation service; calculating an estimated evacuation waiting time for each floor to be evacuated by the normal evacuation service, wherein the calculation takes into account that the at least one person allowed to the prioritized evacuation service is evacuated first; and causing display of the estimated evacuation waiting time iii each building floor to be evacuated by the normal evacuation service.

16 Claims, 4 Drawing Sheets

(51) Int. Cl.
  *B66B 5/02* (2006.01)
  *B66B 1/34* (2006.01)
  *B66B 11/02* (2006.01)
  *G05B 15/02* (2006.01)

(58) Field of Classification Search
  USPC ................. 187/247, 380–388, 391–393, 902
  See application file for complete search history.

(56) References Cited

U.S. PATENT DOCUMENTS

| | | | | |
|---|---|---|---|---|
| 7,210,564 B2* | 5/2007 | Kawai | ..................... | B66B 5/024 |
| | | | | 187/313 |
| 7,461,723 B2* | 12/2008 | Kawai | ..................... | B66B 5/024 |
| | | | | 187/313 |
| 7,588,126 B2* | 9/2009 | Siikonen | ................. | B66B 5/022 |
| | | | | 187/313 |
| 7,594,564 B2* | 9/2009 | Siikonen | ................. | B66B 5/021 |
| | | | | 187/290 |
| 7,621,378 B2* | 11/2009 | Kawai | ..................... | B66B 5/024 |
| | | | | 187/313 |
| 8,151,943 B2* | 4/2012 | de Groot | ............... | B66B 1/2458 |
| | | | | 187/382 |
| 8,763,761 B2* | 7/2014 | Siikonen | ................. | B66B 5/021 |
| | | | | 187/384 |
| 8,839,914 B2* | 9/2014 | Iwata | ...................... | B66B 5/024 |
| | | | | 187/384 |
| 2006/0201751 A1 | 9/2006 | Kawai | | |
| 2007/0272497 A1 | 11/2007 | Kawai | | |
| 2012/0267202 A1 | 10/2012 | Siikonen | | |

FOREIGN PATENT DOCUMENTS

| | | |
|---|---|---|
| FI | 125122 B | 6/2015 |
| JP | 2011126614 A | 6/2011 |
| JP | 2012056696 A | 3/2012 |
| JP | 5721249 B2 | 5/2015 |
| WO | WO-2005121004 A1 | 12/2005 |
| WO | WO-2006085386 A1 | 8/2006 |
| WO | WO-2011092380 A1 | 8/2011 |

OTHER PUBLICATIONS

Written Opinion of the International Searching Authority PCT/ISA/237 for International Application No. PCT/FI2013/050595 dated Jan. 10, 2014.

Office Action dated Nov. 1, 2016 by the *State Intellectual Property Office* (*SIPO*) for corresponding Application No. CN 201380077059.4.

* cited by examiner

ELEVATOR EVACUATION SYSTEM CONFIGURED TO ACCOUNT FOR PRIORITIZED EVACUATION

This application is a continuation of PCT International Application No. PCT/FI2013/050595 which has an International filing date of May 31, 2013, the entire contents of which are incorporated herein by reference.

FIELD OF THE INVENTION

The invention relates to evacuating people with an elevator system. Especially, the invention relates to a method, computer program and apparatus for evacuating people with an elevator system.

BACKGROUND OF THE INVENTION

Evacuation in buildings is usually a complicated issue to solve. Normally, in an evacuation situation, the use of elevators may be prohibited, for example, due to legislation or that the elevators are not fire proof. When considering evacuation in high buildings, the question whether to use elevators has to be evaluated again. If a building is very high and a fire occurs in the middle in terms of height of the building, it might not even be possible to evacuate people from the upper half of the building using staircases, for example, due to a fire. Thus, the use of elevators might be the only option for evacuation. Due to this, elevators may be designed to be usable also in evacuation situations. For example, a lobby area may be smoke protected, the elevators themselves may be fire protected, separate power supply for emergency situations may be provided, shafts may be pressurized etc.

A real evacuation situation, for example due to a fire, is a complex situation especially in high buildings where elevators can be used in the evacuation. People are afraid and their behavior might not always be rational under evacuation.

Furthermore, if both elevators and staircases can be used in an evacuation situation, it may be difficult for the people under evacuation to decide which option (elevator/staircase) to use, i.e. which option would result in a quicker or more efficient evacuation procedure. Furthermore, the evacuation situation may involve also a special group of people, for example, handicapped people, to whom the only available evacuation method is an elevator evacuation.

Based on the above, there is a need for a solution which provides a more efficient evacuation procedure when elevators are used in the evacuation.

SUMMARY OF THE INVENTION

According to a first aspect of the invention, there is provided a method for evacuating people with an elevator system. The method comprises identifying an evacuation mode in the elevator system; determining the amount of people in each building floor to be evacuated by a normal evacuation service of the elevator system and whether there exists at least one person to be evacuated who is entitled to a prioritized evacuation service; calculating an estimated evacuation waiting time for each floor to be evacuated by the normal evacuation service, wherein the calculation takes into account that the at least one person allowed to the prioritized evacuation service is evacuated first; and causing display of the estimated evacuation waiting time in each building floor to be evacuated by the normal evacuation service.

According to a second aspect of the invention, there is provided a computer program comprising program code, which when executed by at least one processor, perform the method of the invention. In one embodiment, the computer program is embodied on a computer readable medium.

According to a third aspect of the invention, there is provided an apparatus comprising at least one processor and at least one memory connected to the at least one processor. The at least one memory comprises program code instructions which when executed by the at least one processor, executes the following: identifying an evacuation mode in the elevator system; determining the amount of people in each building floor to be evacuated by a normal evacuation service of the elevator system and whether there exists at least one person to be evacuated who is entitled to a prioritized evacuation service; calculating an estimated evacuation waiting time for each floor to be evacuated by the normal evacuation service, wherein the calculation takes into account that the at least one person allowed to the prioritized evacuation service is evacuated first; and causing display of the estimated evacuation waiting time in each building floor to be evacuated by the normal evacuation service.

The determining the amount of people in each building floor to be evacuated may comprise determining the amount of people based on destination calls from each building floor.

The method may also comprise redetermining the amount of people in each building floor to be evacuated by the normal evacuation service of the elevator system and whether there exists at least one person to be evacuated who is entitled to a prioritized evacuation service during the evacuation mode.

The method may also comprise recalculating the estimated evacuation waiting time for each floor to be evacuated by the normal evacuation service; and causing display of the recalculated estimated evacuation waiting time in the each building floor to be evacuated by the normal evacuation service.

The calculating the estimated evacuation waiting time for each floor to be evacuated by the normal evacuation service may take into account at least one of longer stop time, longer passenger transfer time and a reduced car capacity of the prioritized evacuation service.

The evacuation performed in the evacuation mode may be performed floor-by-floor basis.

In one embodiment, the elevator system comprises a double-deck elevator, and evacuation by the normal evacuation service is arranged with a first elevator car of the double-deck elevator, and evacuation by the prioritized evacuation service is arranged with a second elevator car of the double-deck elevator.

According to a third aspect of the invention, there is provided an elevator system comprising an apparatus of any of claims 10-16; at least one elevator car for evacuating people during an evacuation mode; and at least one display device in each building floor for displaying an estimated evacuation waiting time.

The embodiments of the invention described herein may be used in any combination with each other. Several of the embodiments may be combined together to form a further embodiment of the invention.

SHORT DESCRIPTION OF THE DRAWINGS

DETAILED DESCRIPTION OF THE INVENTION

Reference will now be made in detail to the embodiments of the present invention, examples of which are illustrated in the accompanying drawings.

Figure 1:
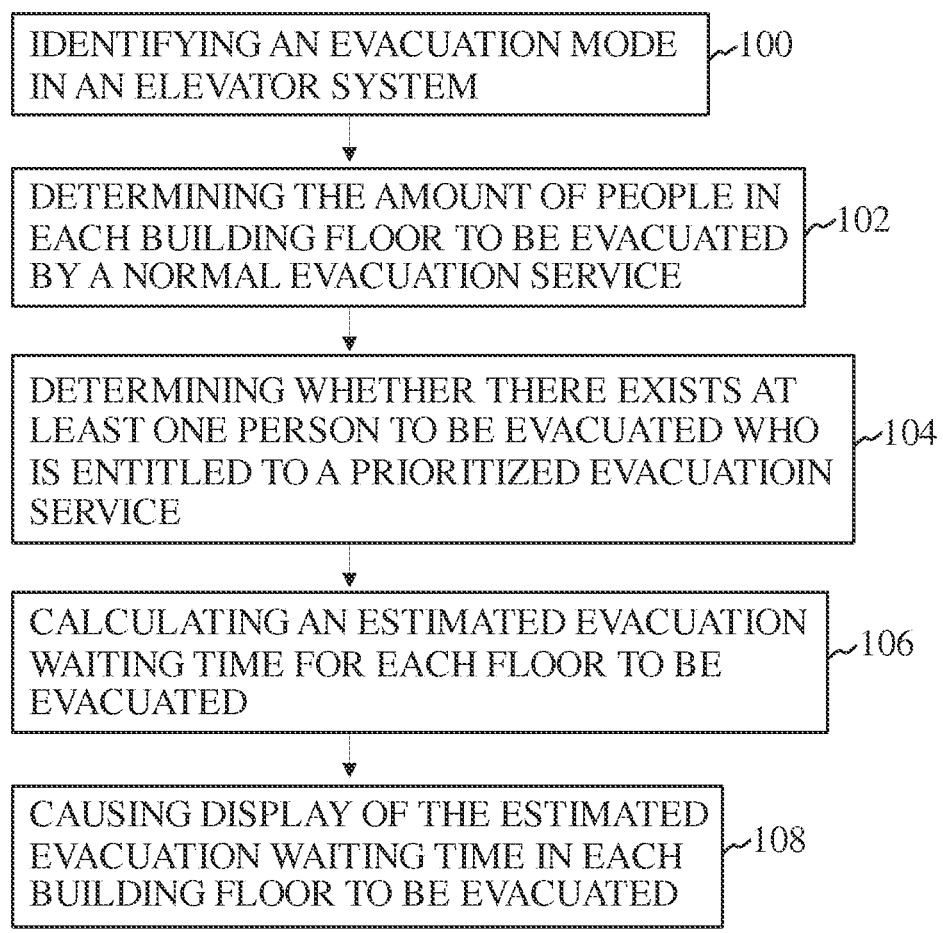
FIG. 1 illustrates a method according to one embodiment of the invention.

FIG. 1 illustrates a method according to one embodiment of the invention. In step 100 it is identified that an evacuation mode is active in an elevator system of a building. In this embodiment, elevators can be used in evacuation people from the building in an evacuation situation, e.g. in case of fire. In step 102 the amount of people in each building floor to be evacuated by a normal evacuation service of the elevator system is determined. The determination can be made using an appropriate technique or a combination of techniques. If the elevator system is a destination control system, the elevator system is aware of the floors to which people travel. Access control information may also be used in determining the amount of people in each building floor since the people arriving at a floor may have to use some identification method in order to access the floor.

In step 104 it is determined whether there exists at least one person to be evacuated who is entitled to a prioritized evacuation service. A person who is entitled to the prioritized evacuation service is, for example, a handicapped person who needs to use a wheelchair.

In step 106 an estimated evacuation waiting time for each floor to be evacuated by the normal evacuation service is calculated. The calculation takes into account that the at least one person allowed to the prioritized evacuation service is evacuated first and only then normal evacuation is performed.

In step 108 the estimated evacuation waiting time is caused to be displayed in each building floor to be evacuated by the normal evacuation service. This provides additional information to the people who are waiting in a lobby for an elevator that will evacuate them. Furthermore, since the estimated evacuation waiting time is known, each person is able to make an own decision whether to use stairs to evacuate or to wait for the elevator.

Figure 2:
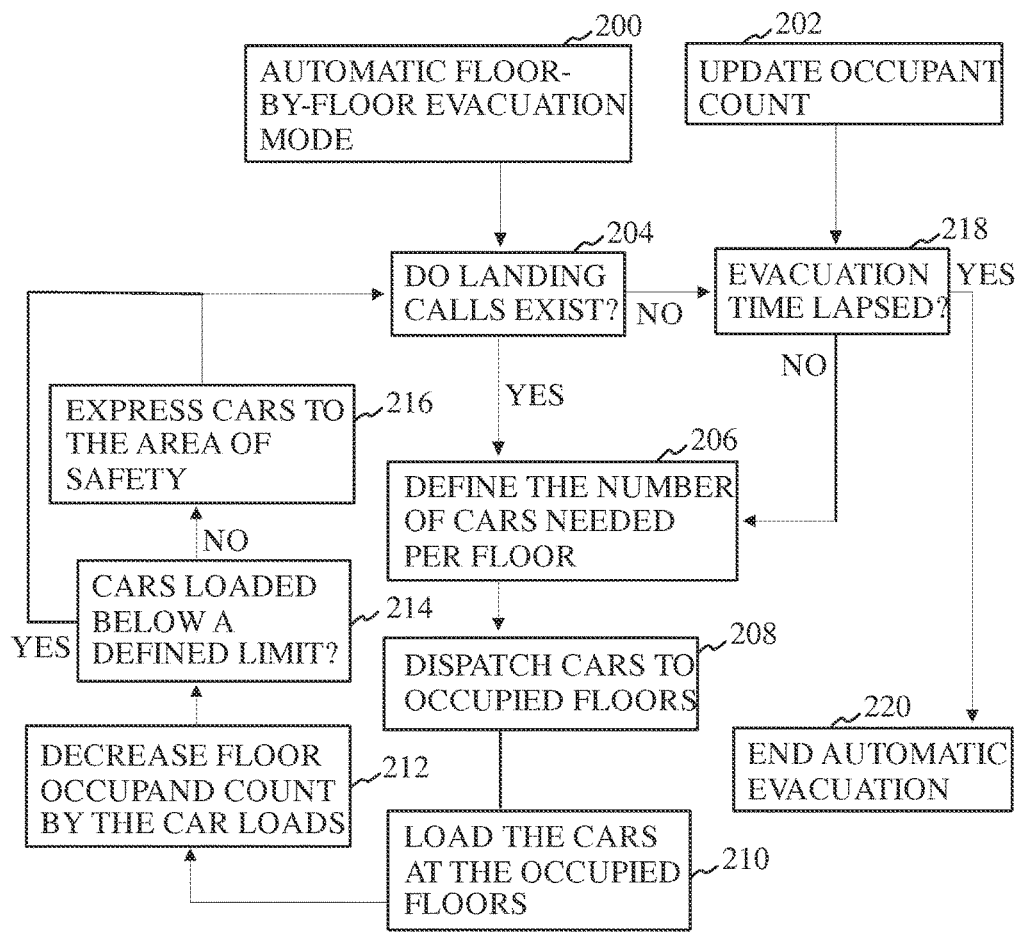
FIG. 2 is a block diagram illustrating an evacuation procedure according to one embodiment of the invention.

FIG. 2 is a block diagram illustrating an evacuation procedure according to one embodiment of the invention. The embodiment in FIG. 2 uses a floor-by-floor evacuation procedure. In other embodiment, the evacuation procedure may be a staged evacuation or fractional evacuation.

Block 200 indicates that an automatic floor-by-floor evacuation mode has been activated. The activation results, for example, in a fire alarm or any other signal received by the elevator system indicating evacuation situation. In block 204 it is determined whether landing calls exist. If they exist, it means that there are people to be evacuated. In block 206 the number of cars needed per floor in defined. Block 202 indicates that occupant count is updated. The updating may be continuous or may be made after certain events. Thus, in block 206 it is possible to define the number of cars needed to evacuate the amount of people waiting in each floor. Cars are then dispatched to occupied floors, as indicated in block 208. The cars are loaded at the occupied floor, block 210. The number of occupants remaining at the floor may be determined by decreasing the floor occupant count by the car loads, block 212. If it is determined in block 214 that the cars are not loaded below a defined limit, the cars are expressed to the area of safety, i.e. to a predetermined rescue level, block 216. If it is determined in block 214 that the cars are loaded below a defined limit, the processing continues to block 204 where it is determined whether landing calls exist. For example, the elevator car may be sent to the next floor to be evacuated to receive additional occupants. If landing calls remain to exist as indicated in box 204, the process described above is executed gain. If no landing calls exist, it is checked in block 218 whether the evacuation time has lapsed. If the evacuation time has not yet lapsed, the process returns to block 206. If the evacuation time has lapsed, the automatic evacuation mode ends, as indicated in block 220.

The occupant count in block 202 may be updated based on several signals. The occupant count may be based on forecasts, various measurements (for example, using detectors, elevator weighing devices etc.), information from destination control panels etc.

Figure 3:
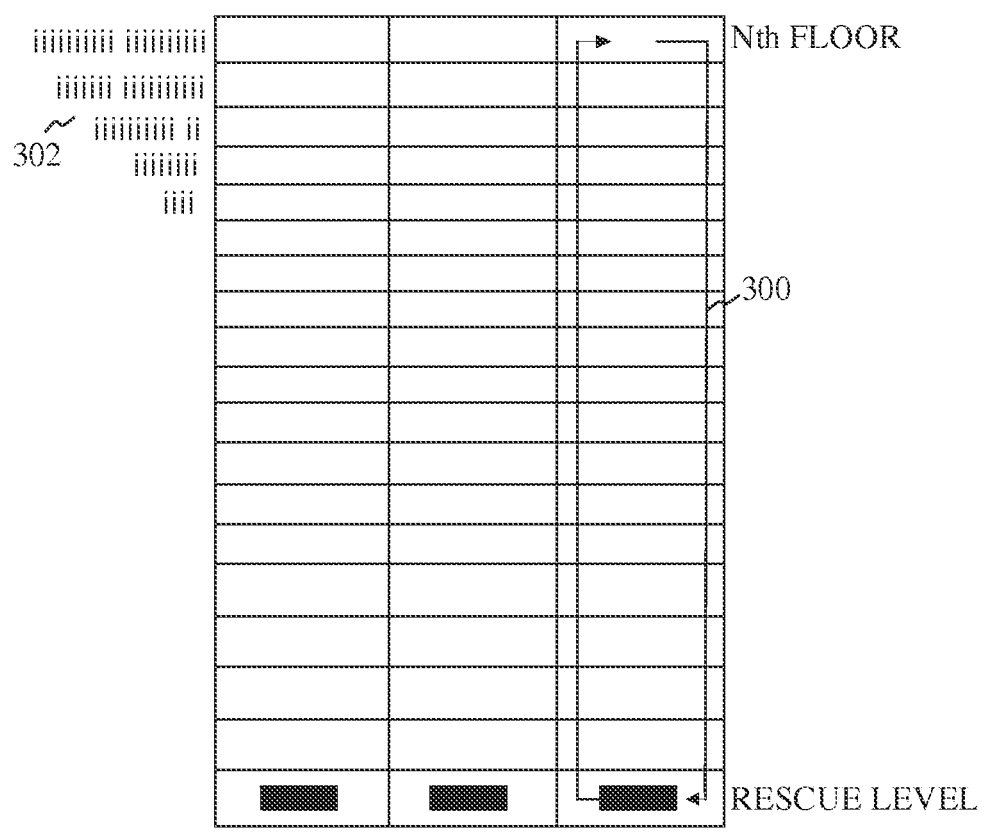
FIG. 3 illustrates calculating an evacuation time according to one embodiment of the invention.

FIG. 3 illustrates calculating an evacuation time according to one embodiment of the invention. FIG. 3 illustrates a building which has N floors and where L elevators are used in evacuating people from the floors. In this embodiment, people are evacuated using floor-by-floor evacuation starting from the furthest floor to the rescue level. An evacuation time $T_k$ per floor is calculated considering round trips 300 from floor N before reaching the floor k and the number of evacuation elevators L. Reference number 302 refers to people waiting for elevator evacuation in various floors.

The round trip time of an elevator and a waiting time per floor k may be calculated as follows:

$$T_R = 2Hs/v + 2t_s + 2Mt_m$$

$$T_k = \sum_{i=k+1}^{N} \sum_{j=1}^{J_i} T_{RT,i,j}/L$$

$T_{RT}$=Round trip time of an elevator
$T_k$=Waiting time per floor k
H=Rescue level/floor
M=Car capacity (M persons)
s=Floor height
v=Speed on an elevator
$t_s$=Stop time
$t_m$=Passenger transfer time
$J_i$=Number of round trips per floor i carrying all waiting people
L=Number of elevators Prioritized evacuation service may be taken into account in the above formulas. For example, if a handicapped person is to be evacuated, it affects several parameters above. Normally the car capacity is M persons, but in the case of a handicapped person, the car used car capacity may be regarded as 1. The stop time $t_m$ is normally, for example, 10 seconds, and in the case on a handicapped person it is longer, for example, 20 seconds. The passenger transfer time is 1 second for normal people, but 10 second for a handicapped person.

When determining the waiting times, prioritized evacuation service may be executed first thus resulting in a faster evacuation for handicapped persons. When determining the waiting times for normal evacuation service, i.e. for people not entitled to the prioritized evacuation service, the time spent for evacuating the handicapped persons is taken into account in the calculations. When the people to be evacuated know the estimated waiting time, each person is able to make an own decision whether to use stairs to evacuate or to wait for the elevator. This makes the evacuation process more efficient.

The estimated evacuation waiting time calculations may be executed several time or even continuously during the evacuation mode. For example, originally it was counted that in a certain floor there are 55 persons to be evacuated and the estimated evacuation waiting time was calculated based on this count. Some time later 25 persons chose to use the stairs and thus are no longer waiting for elevator evacuation. The elevator control system learns the updated people count waiting for the elevator evacuation (for example, via input means in a lobby or some other information source). The elevator control system then makes new estimated evacuation waiting time calculations based on the updated count and provides an updated estimation.

In one embodiment, two separate waiting times per floor may be calculated: (1) waiting time for prioritized evacuation service and (2) waiting time for normal evacuation service. These times may be separately displayed on each evacuated floor.

Figure 4:
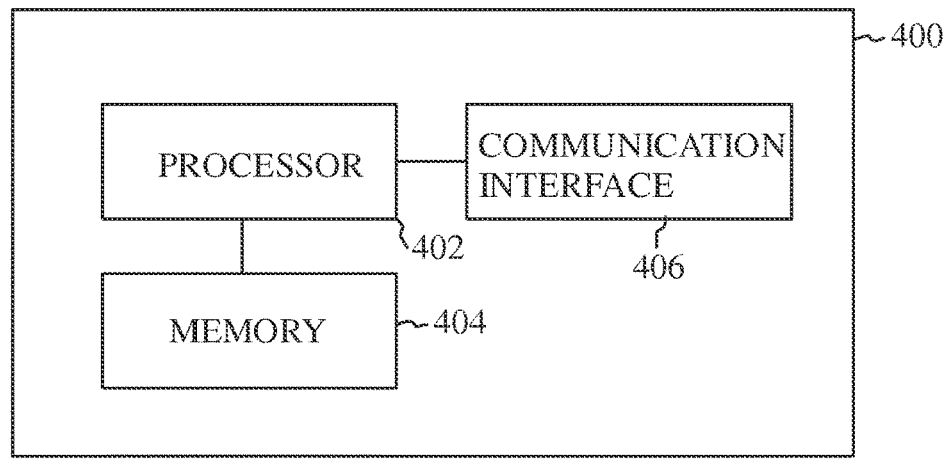
FIG. 4 illustrates a block diagram of an apparatus according to one embodiment of the invention.

FIG. 4 discloses a block diagram illustrating an apparatus 400 according to one embodiment of the invention. The apparatus comprise a processor 402 connected to a memory 404. The apparatus may also comprise several processors or memories. The memory 404 or memories comprises at least one computer program which, when executed by the processor 402 or processors, causes the apparatus to perform the programmed functionality. The apparatus may also comprise a communication interface 406 configured to receive/transmit information from/to external entities. The communication device may be used to transmit information to be displayed on a display device on each floor during evacuation situation. The apparatus 400 is any processing device that is able to implement the features of the invention, for example, a server computer.

Figure 5:
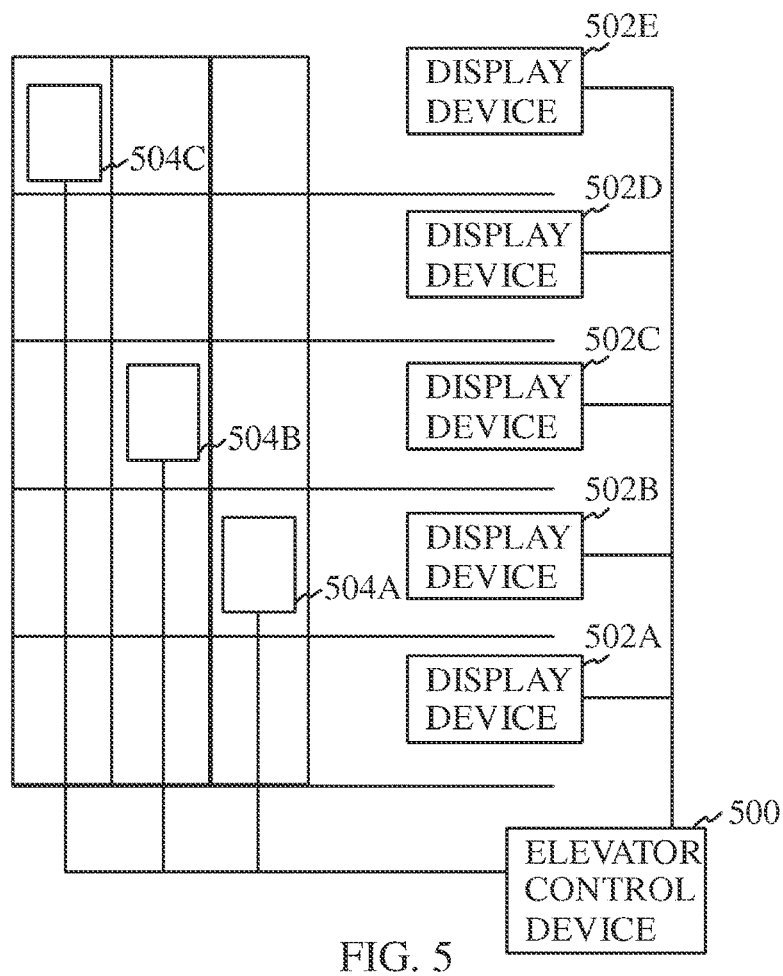
FIG. 5 illustrates a system according to one embodiment of the invention.

FIG. 5 illustrates a system according to one embodiment of the invention. The system in FIG. 5 is a simplified illustration of an elevator system where evacuation is performed when an evacuation mode is active. The system comprises an elevator control device 500 which is responsible for controlling elevator cars 504A-504C. The elevator control device 500 is also connected to display devices 502A-502E provided on building floors. The elevator control device 500 is configured to calculate an estimated evacuation waiting time for each floor to be evacuated by a normal evacuation service, wherein the calculation takes into account that the at least one person allowed to prioritized evacuation service is evacuated first. The elevator control device 500 then transmits the estimated waiting times to the display device 502E. Each display device 502A-502E thus displays the estimated waiting time relating to the floor where the display device resides.

In one modified embodiment of FIG. 5, at least one elevator in the elevator system is a double-deck elevator. Thus, evacuation by the normal evacuation service may be arranged with a first elevator car of the double-deck elevator, and simultaneously, evacuation by the prioritized evacuation service may be arranged with a second elevator car of the double-deck elevator.

The exemplary embodiments of the invention can be included within any suitable device, for example, including any suitable servers, workstations, PCs, laptop computers, capable of performing the processes of the exemplary embodiments, and which can communicate via one or more interface mechanisms. The exemplary embodiments may also store information relating to various processes described herein.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like.

While the present inventions have been described in connection with a number of exemplary embodiments, and implementations, the present inventions are not so limited, but rather cover various modifications, and equivalent arrangements, which fall within the purview of prospective claims.

Furthermore, the embodiments of the invention described herein may be used in any combination with each other. Several of the embodiments may be combined together to form a further embodiment of the invention.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for evacuating people with an elevator system, the method comprising:
    identifying an evacuation mode in the elevator system;
    determining an amount of people in each building floor to be evacuated by a normal evacuation service of the elevator system;
    determining whether there exists at least one person to be evacuated who is entitled to a prioritized evacuation service;
    calculating an estimated evacuation waiting time for each floor to be evacuated by the normal evacuation service such that the calculating increases the estimated evacuation waiting time in response to determining that there exists the at least one person entitled to prioritized evacuation service that will be evacuated prior to the people to be evacuated by the normal evacuation service; and
    causing display of the estimated evacuation waiting time in each building floor to be evacuated by the normal evacuation service.

2. The method according to claim 1, wherein determining the amount of people in each building floor to be evacuated comprises determining the amount of people based on destination calls from each building floor.

3. The method according to claim 1, further comprising:
    redetermining the amount of people in each building floor to be evacuated by the normal evacuation service of the elevator system and whether there exists at least one person to be evacuated who is entitled to a prioritized evacuation service during the evacuation mode.

4. The method according to claim 3, further comprising:
recalculating the estimated evacuation waiting time for each building floor to be evacuated by the normal evacuation service; and
causing display of the recalculated estimated evacuation waiting time in the each building floor to be evacuated by the normal evacuation service.

5. The method according to claim 1, wherein calculating the estimated evacuation waiting time for each floor to be evacuated by the normal evacuation service takes into account at least one of longer stop time, longer passenger transfer time and a reduced car capacity of the prioritized evacuation service.

6. The method according to claim 1, further comprising:
performing evacuation in the evacuation mode on a floor-by-floor basis.

7. The method according to claim 1, wherein the elevator system comprises a double-deck elevator, the method comprising:
arranging evacuation by the normal evacuation service with a first elevator car of the double-deck elevator; and
arranging evacuation by the prioritized evacuation service with a second elevator car of the double-deck elevator.

8. A non-transitory computer readable medium storing including program code instructions, which when executed by at least one processor, configures the at least one processor to perform the method of claim 1.

9. An apparatus in an elevator system, the apparatus comprising:
at least one memory storing program code instructions; and
at least one processor configured to read the program code instructions to perform a method, the method including,
identifying an evacuation mode in the elevator system;
determining an amount of people in each building floor to be evacuated by a normal evacuation service of the elevator system;
determining whether there exists at least one person to be evacuated who is entitled to a prioritized evacuation service;
calculating an estimated evacuation waiting time for each floor to be evacuated by the normal evacuation service such that the at least one processor increases the estimated evacuation waiting time in response to determining that there exists the at least one person entitled to prioritized evacuation service that will be evacuated prior to the people to be evacuated by the normal evacuation service; and
causing display of the estimated evacuation waiting time in each building floor to be evacuated by the normal evacuation service.

10. The apparatus according to claim 9, wherein the at least one memory comprises program code instructions which when executed by the at least one processor, executes the following:
determining the amount of people based on destination calls from each building floor.

11. The apparatus according to claim 9, wherein the at least one memory comprises program code instructions which when executed by the at least one processor, executes the following:
redetermining the amount of people in each building floor to be evacuated by the normal evacuation service of the elevator system and whether there exists at least one person to be evacuated who is entitled to a prioritized evacuation service during the evacuation mode.

12. The apparatus according to claim 11, wherein the at least one memory comprises program code instructions which when executed by the at least one processor, executes the following:
recalculating the estimated evacuation waiting time for each building floor to be evacuated by the normal evacuation service; and
causing display of the recalculated estimated evacuation waiting time in the each building floor to be evacuated by the normal evacuation service.

13. The apparatus according to claim 9, wherein the at least one memory comprises program code instructions which when executed by the at least one processor, executes the following:
calculating the estimated evacuation waiting time for each floor to be evacuated by the normal evacuation service takes into account at least one of longer stop time, longer passenger transfer time and a reduced car capacity of the prioritized evacuation service.

14. The apparatus according to claim 9, wherein the at least one memory comprises program code instructions which when executed by the at least one processor, executes the following:
performing evacuation in the evacuation mode on a floor-by-floor basis.

15. The apparatus according to claim 9, wherein the elevator system comprises a double-deck elevator and wherein the at least one memory comprises program code instructions which when executed by the at least one processor, executes the following:
arranging evacuation by the normal evacuation service with a first elevator car of the double-deck elevator; and
arranging evacuation by the prioritized evacuation service with a second elevator car of the double-deck elevator.

16. An elevator system comprising:
an apparatus of claim 9;
at least one elevator car for evacuating people during an evacuation mode; and
at least one display device in each building floor for displaying an estimated evacuation waiting time.

* * * * *